United States Patent
Soulhi et al.

(10) Patent No.: US 12,348,619 B2
(45) Date of Patent: Jul. 1, 2025

(54) SYSTEMS AND METHODS FOR PROVIDING ENHANCED MULTI-LAYERED SECURITY WITH ENCRYPTION MODELS THAT IMPROVE ZERO-TRUST ARCHITECTURES

(71) Applicant: Verizon Patent and Licensing Inc., Basking Ridge, NJ (US)

(72) Inventors: Said Soulhi, Saint Cloud, FL (US); Adam Barron, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 249 days.

(21) Appl. No.: 18/317,476

(22) Filed: May 15, 2023

(65) Prior Publication Data

US 2024/0388423 A1 Nov. 21, 2024

(51) Int. Cl.
*H04L 9/08* (2006.01)
*G06N 3/08* (2023.01)

(52) U.S. Cl.
CPC ............. *H04L 9/0847* (2013.01); *G06N 3/08* (2013.01); *H04L 9/0869* (2013.01)

(58) Field of Classification Search
CPC ....... H04L 9/0847; H04L 9/0869; G06N 3/08; G06N 3/044; G06N 3/045; G06N 3/047; G06N 7/01
See application file for complete search history.

(56) References Cited

U.S. PATENT DOCUMENTS

| | | | | |
|---|---|---|---|---|
| 8,108,678 B1* | 1/2012 | Boyen | ................... | H04L 9/0847 713/176 |
| 10,956,584 B1* | 3/2021 | Heaton | ................. | G06F 9/3802 |
| 11,886,554 B1* | 1/2024 | Zhang | ..................... | G06F 21/57 |
| 12,126,714 B2* | 10/2024 | Almeida | ................ | H04L 9/001 |
| 2006/0095771 A1* | 5/2006 | Appenzeller | ......... | H04L 9/3247 713/171 |
| 2013/0108040 A1* | 5/2013 | Luukkala | .............. | H04L 9/0847 380/30 |

(Continued)

OTHER PUBLICATIONS

Millar et al.: "DANdroid: A Multi-View Discriminative Adversarial Network for Obfuscated Android Malware Detection" Mar. 2020, ACM ISBN 978-1-4503-7107-0/20/03, pp. 353-364. (Year: 2020).*

(Continued)

*Primary Examiner* — Matthew Smithers

(57) ABSTRACT

A device may generate neural network encryption models based on a dataset descriptor, a dataset geometry, and selected neural network types, and may generate obfuscation features based on the dataset descriptor, a noise type, an obfuscation model type, and noise and model parameters. The device may train the neural network encryption models, with a dataset and the obfuscation features, to generate model weights, a latent space, and noising and denoising models, and may generate an intelligent decryption model based on the model weights, the latent space, and the noising and denoising models. The device may receive an encrypted dataset associated with a target environment, and may determine whether the target environment is valid according to immune rules. The device may process, based on determining that the target environment is valid, the encrypted dataset, with the intelligent decryption model, to generate a decrypted dataset.

20 Claims, 12 Drawing Sheets

(56) References Cited

U.S. PATENT DOCUMENTS

| | | | | |
|---|---|---|---|---|
| 2013/0287206 | A1* | 10/2013 | Hattori | H04L 9/3073 |
| | | | | 380/30 |
| 2017/0099144 | A1* | 4/2017 | Sobel | H04L 9/0863 |
| 2019/0068362 | A1* | 2/2019 | Anderson | G06N 5/025 |
| 2019/0260589 | A1* | 8/2019 | Tang | H04W 12/06 |
| 2024/0211609 | A1* | 6/2024 | Yue | G06F 21/64 |

OTHER PUBLICATIONS

Appenzeller et al., "Identity-Based Encryption Architecture and Supporting Data Structures," Network Working Group, Request for Comments: 5408, Jan. 2009, 30 Pages.

* cited by examiner

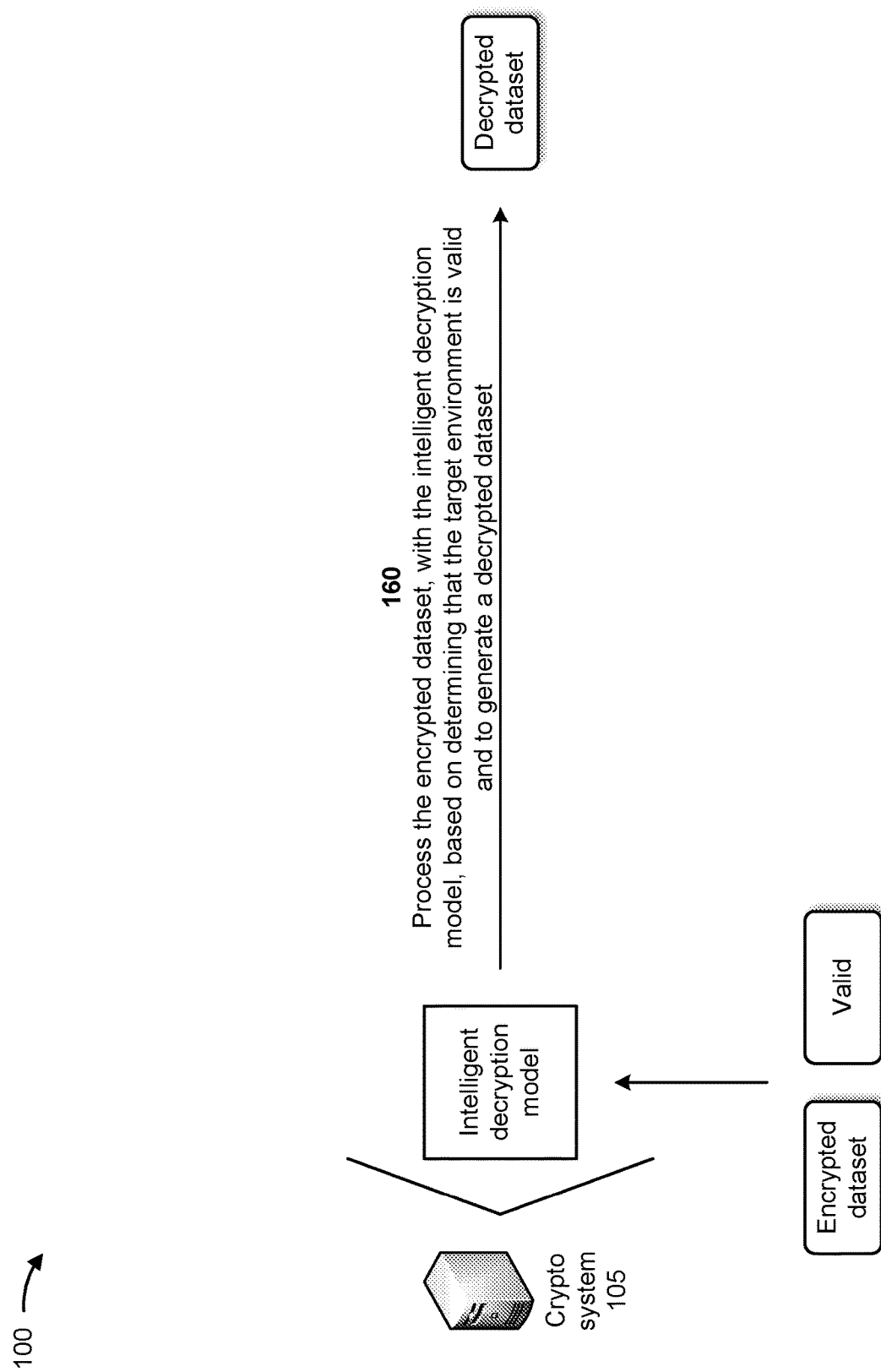

SYSTEMS AND METHODS FOR PROVIDING ENHANCED MULTI-LAYERED SECURITY WITH ENCRYPTION MODELS THAT IMPROVE ZERO-TRUST ARCHITECTURES

BACKGROUND

Encryption models used for secure data transmission are based on known mathematical schemes, such as one-way functions (e.g., the Rivest-Shamir-Adleman (RSA) function, the Rabin function, the Kyber function, and/or the like), to generate key pairs. Secure public keys are shared secrets that are easy to compute in polynomial time, but are difficult to invert with probabilistic polynomial time. Zero trust is a security framework requiring all users, whether inside or outside a network, to be authenticated, authorized, and continuously validated for security configuration and posture before being granted or keeping access to applications and data. Such mathematical functions can be broken with appropriate computing resources. For example, some public key encryption schemes (e.g., schemes based on prime integer factorization) can be broken by a quantum computer with enough qubits. Furthermore, specifications of the mathematical functions available to the public, which exposes zero trust security architectures to failures and threats.

BRIEF DESCRIPTION OF THE DRAWINGS

FIGS. 1A-1H are diagrams of an example associated with providing enhanced multi-layered security with encryption models that improve zero-trust architectures.

DETAILED DESCRIPTION OF EXAMPLE EMBODIMENTS

Figure 1A:
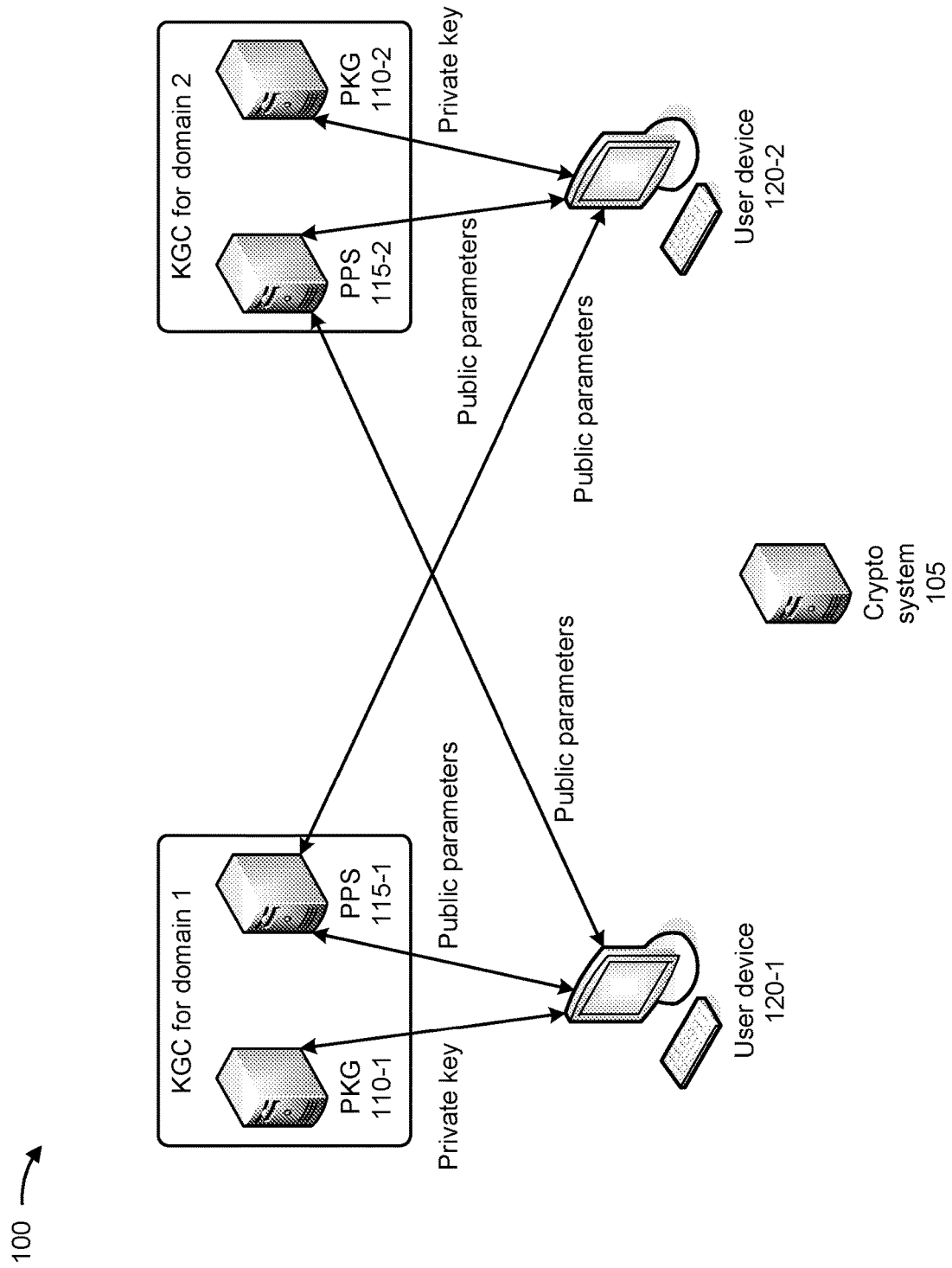

The following detailed description of example implementations refers to the accompanying drawings. The same reference numbers in different drawings may identify the same or similar elements.

Secure public keys (e.g., shared secrets) are easy to compute in polynomial time with models but are difficult to invert with probabilistic polynomial time. Examples of such models are the Rivest-Shamir-Adleman (RSA) model, the Rabin model, the Kyber model, and/or the like. These models can be compromised by cyber criminals with appropriate computing resources. For example, a public key encryption model, such as the RSA model, can be compromised by a quantum computer. One drawback of these models is that specifications of the models are open and available to the public. Some data (e.g., military data, government data, sensitive industrial data, and/or the like) requires extremely high security and needs to be shielded from brute force threats, such as exhaustively enumerating and attempting encryption keys with quantum computing. Quantum computing makes today's public key encryption strategies unsafe and may be utilized to compromise most public key methods, such as RSA and elliptic curve encryption. Thus, current techniques for public key encryption consume computing resources (e.g., processing resources, memory resources, communication resources, and/or the like), networking resources, and/or other resources associated with failing to protect data from security threats, attempting to recover data compromised by security threats, identifying data compromised by security threats, handling inappropriate uses of data compromised by security threats, and/or the like.

Some implementations described herein relate to a crypto system that provides enhanced multi-layered security with encryption models that improve zero-trust architectures. For example, the crypto system may generate neural network encryption models based on a dataset descriptor, a dataset geometry, and selected neural network types, and may generate obfuscation features based on the dataset descriptor, a noise type, an obfuscation model type, and noise and model parameters. The crypto system may train the neural network encryption models, with a dataset and the obfuscation features, to generate model weights, a latent space, and noising and denoising models, and may generate an intelligent decryption model based on the model weights, the latent space, and the noising and denoising models. The crypto system may receive an encrypted dataset associated with a target environment (e.g., an environment with secure data), and may process the encrypted dataset, with the intelligent decryption model, to determine whether the target environment is valid (e.g., a valid environment) according to immune rules (e.g., rules that limit access to data). The crypto system may prevent decryption of the encrypted dataset based on determining that the target environment is invalid (e.g., invalid environment according to the immune rules). The crypto system may process the encrypted dataset, with the intelligent decryption model, to generate a decrypted dataset, based on determining that the target environment is valid, and may perform one or more actions based on the decrypted dataset.

In this way, the crypto system provides enhanced multi-layered security with encryption models that improve zero trust architectures. For example, the crypto system may provide a neural network model based encryption layer to current infrastructures to enhance zero trust security for extremely sensitive data, such as customer proprietary network data, government data, military data, and/or the like. The neural network model-based encryption layer may be based on private generative encrypting machine learning models that are shared through an intelligent agent. The crypto system may enhance zero trust data security efficiency to mitigate threats (e.g., quantum attacks made by governments, industries, cybersecurity military, and/or the like) and future advances in decryption methods. Thus, the crypto system may conserve computing resources, networking resources, and/or other resources that would have otherwise been consumed by failing to protect data from security threats, attempting to recover data compromised by security threats, identifying data compromised by security threats, handling inappropriate uses of data compromised by security threats, and/or the like.

FIGS. 1A-1H are diagrams of an example 100 associated with providing enhanced multi-layered security with encryption models that improve zero-trust architectures. As shown in FIGS. 1A-1H, example 100 includes a crypto system 105 associated with a target environment. The target environment may include a key generator center (KGC) for a first domain (e.g., domain 1) that includes a first private key generator (PKG) 110-1 and a first public parameter server (PPS) 115-1. The key generator for the first domain may be associated with a first user device 120-1. The target environment may include a KGC for a second domain (e.g., domain 2) that includes a second PKG 110-2 and a second PPS 115-2. The key generator for the second domain may be associated with a second user device 120-2. In some implementations, the target environment may be an identity-based public key cryptography (ID-PKC) system. The first user device 120-1 may receive a private key from the first PKG 110-1 and may receive public parameters from the first PPS 115-1 and the second PPS 115-2. The second user device 120-2 may receive a private key from the second PKG 110-2 and may receive public parameters from the first PPS 115-1 and the second PPS 115-2. A transport layer security (TLS) secure channel may be utilized to protect the confidentiality and integrity of the public parameters. The crypto system 105 may include a system that provides enhanced multi-layered security with encryption models that improve zero-trust architectures. Further details of the crypto system 105, the PKG 110, the PPS 115, and the user device 120 are provided elsewhere herein.

Figure 1B:
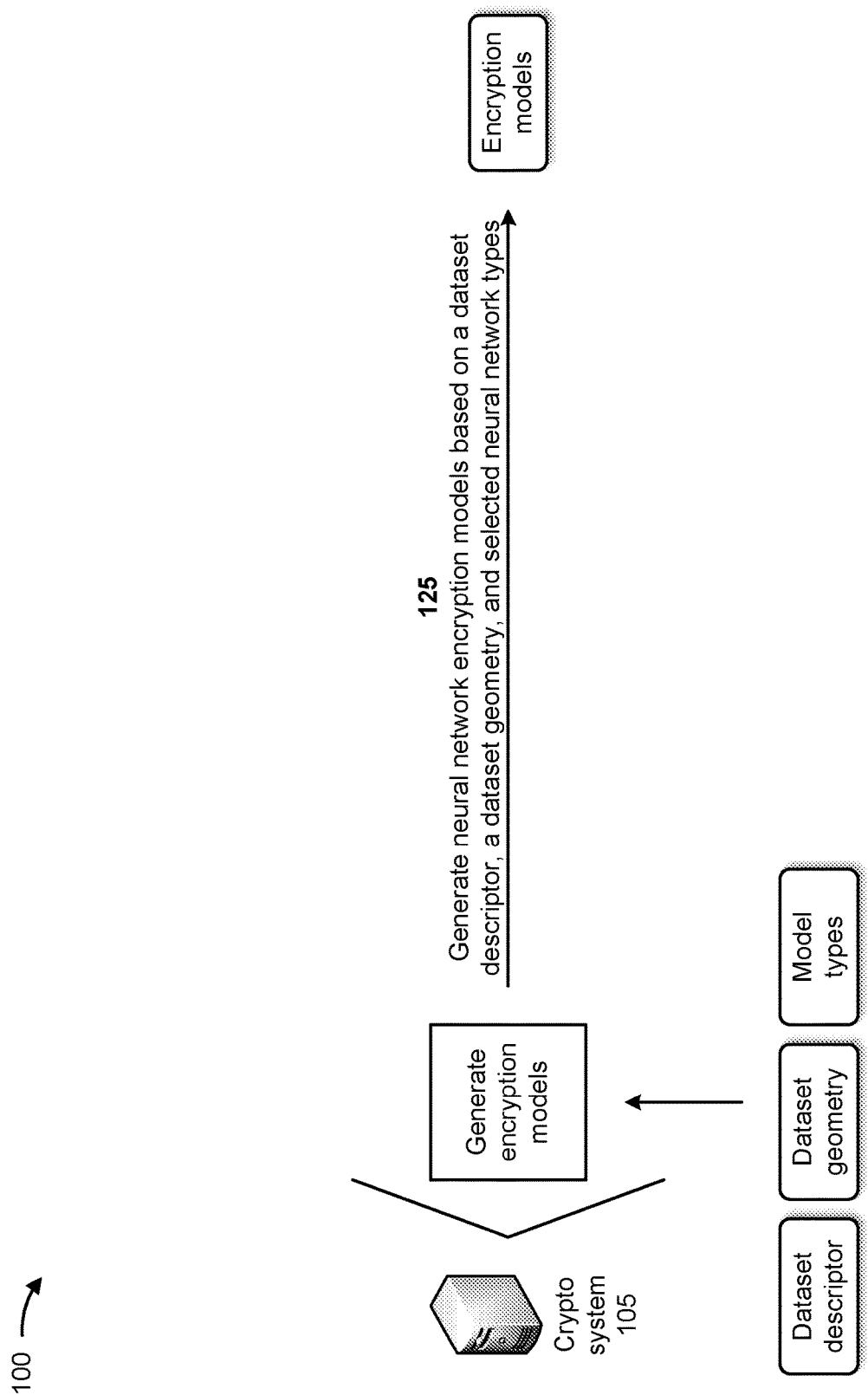

As shown in FIG. 1B, and by reference number 125, the crypto system 105 may generate neural network encryption models based on a dataset descriptor, a dataset geometry, and selected neural network types. For example, the crypto system 105 may generate the dataset descriptor, the dataset geometry, and the selected neural network types based on inputs received from a user of the crypto system 105, a target environment (e.g., the environment of FIG. 1A) associated with the crypto system 105, the type of neural network encryption models to be generated, and/or the like. In some implementations, the crypto system 105 may utilize the dataset descriptor, the dataset geometry, and the selected neural network types to generate the neural network encryption models. The dataset descriptor may include a type (e.g., tabular, images, text, voice, multimodal, and/or the like), time series, features, a size, a domain, and/or the like. The dataset geometry may include a geometry utilized with the dataset, such as Euclidean geometry, non-Euclidean geometry, and/or the like. The neural network encryption models may include one or more of an autoencoder model, a diffusion model, a flow-based model, and/or the like.

In some implementations, when the neural network encryption models include an autoencoder model, the crypto system 105 may generate, for the autoencoder model, random parameters associated with one or more of a quantity of layers, layer types (e.g., a vision transformer or a two-dimensional convolution layer for images, a one-dimensional convolution layer for tabular data, and/or the like), or an activation for each of the layers (e.g., a ReLU activation, a Sigmoid activation, a Softmax activation, periodic activations, and/or the like). The crypto system 105 may generate the autoencoder model (e.g., an encoder decoder architecture) based on the random parameters.

In some implementations, when the neural network encryption models include a diffusion model, the crypto system 105 may generate random parameters for a forward diffusion process and a reverse forward diffusion process (e.g., a quantity of steps, a variance schedule of a Markov chain, and/or the like). The crypto system 105 may define a Markov chain of diffusion steps to gradually add random noise (e.g., Gaussian noise) to data, and may generate the diffusion model based on the random parameters and the Markov chain of diffusion steps. The diffusion model may include a noising and denoising diffusion model architecture (e.g., a time-conditioned U-Net with ResNet layers and augmented with a cross-attention mechanism).

In some implementations, when the neural network encryption models include a flow-based model, the crypto system 105 may generate a model that maps an unknown distribution in an input space to a known distribution in a latent space using normalizing flows (e.g., a series of simple functions which are invertible, such as a Glow architecture). If the dataset geometry is non-Euclidean, the crypto system 105 may adjust the model to directly process non-Euclidean structured data as input and using geometric deep learning, such as graphical neural networks and graph transformers (e.g., to generate the flow-based model).

Figure 1C:
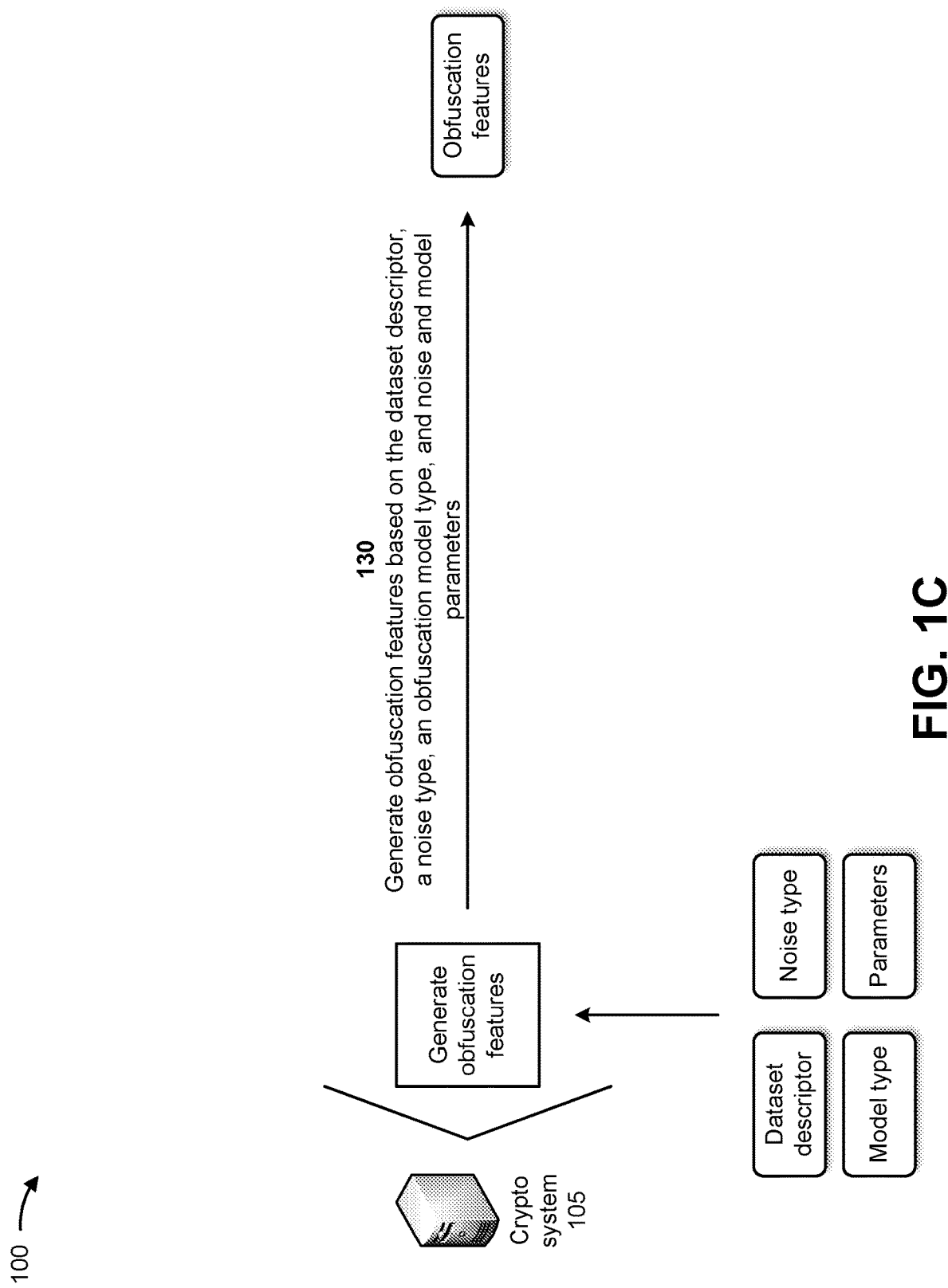

As shown in FIG. 1C, and by reference number 130, the crypto system 105 may generate obfuscation features based on the dataset descriptor, a noise type, an obfuscation model type, and noise and model parameters. For example, the crypto system 105 may generate the dataset descriptor, the noise type, the obfuscation model, and the noise and model parameters based on inputs received from a user of the crypto system 105, the target environment associated with the crypto system 105, the obfuscation features to be generated, and/or the like. In some implementations, the crypto system 105 may utilize the dataset descriptor, a noise type, an obfuscation model type, and noise and model parameters to generate the obfuscation features. The dataset descriptor is described above in connection with FIG. 1B. The noise type may include white noise, red noise, purple noise, grey noise, random walks noise, random walks with drift noise, Laplacian noise, gradient noise, Voronoi noise, simplex noise, Perlin noise, fractal noise, and/or the like. The obfuscation model type may include an autoregressive model, an autoregressive integrated moving average (ARIMA) model, a Gaussian mixture autoregressive (MAR) model, a generative adversarial network (GAN) model, a mathematical function (e.g., a quadratic function, a high-degree polynomial function, and/or the like), and/or the like. The noise and model parameters may include parameters to provide one or more noise types, one or more obfuscation model types, and/or the like.

In some implementations, depending on a domain, a dataset type, and desired characteristics of the obfuscation features, the crypto system 105 may select an appropriate obfuscation model, noise generator, and/or the like to ensure generation of obfuscation features with complex patterns. The crypto system 105 may randomly generate the noise and model parameters. For example, if an obfuscation feature is time series, the crypto system 105 may utilize a random generator to generate random samples from a normal distribution, may utilize an appropriate mathematical function (e.g., a polynomial of a random order or a cubic spline interpolation over a random turning points) to generate the obfuscation features, may generate an autoregressive process with a random order, may utilize a mixture of autoregressive models to describe more varieties of shape-changing distributions since autoregressive models can handle nonlinearity, non-Gaussian, and heteroskedasticity (e.g., heterogeneity of variance) in the time series, may optionally apply some noise (e.g., white noise), and/or the like. If the obfuscation feature is text or speech, the crypto system 105 may utilize an appropriate transformer model trained on a domain. If the obfuscation feature is an image, the crypto system 105 may generate a two-dimensional array using Perlin noise for map generation (e.g., shows a terrain pattern) and may optionally add some noise (e.g., Laplacian noise) to improve visual effects. If the obfuscation feature is three-dimensional, the crypto system 105 may utilize three-dimensional generation mechanisms, such as a video GAN or a Perlin noise function. The crypto system 105 may apply additional techniques to increase an appearance of realism.

Figure 1D:
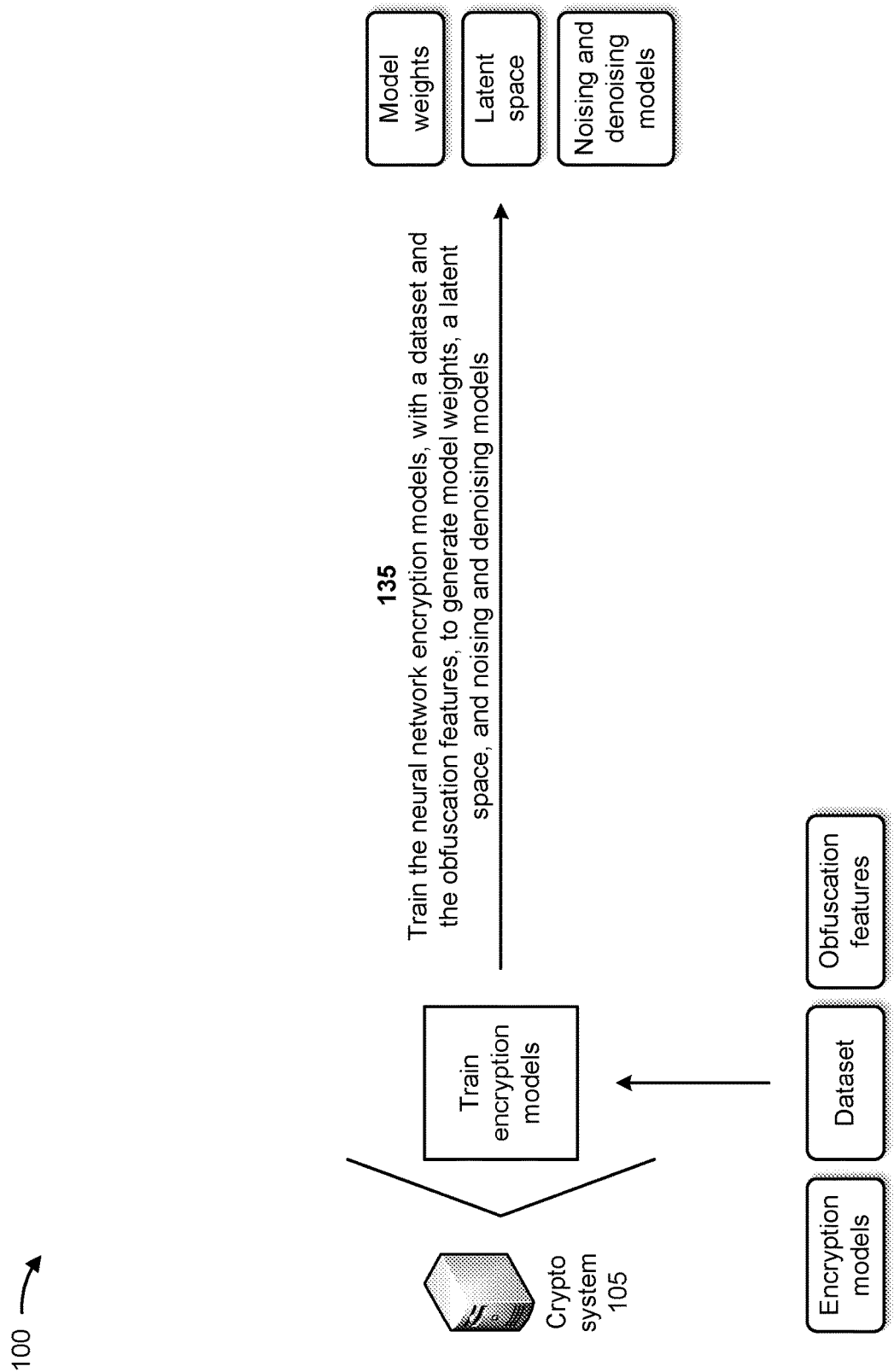

As shown in FIG. 1D, and by reference number 135, the crypto system 105 may train the neural network encryption models, with a dataset and the obfuscation features, to generate model weights, a latent space, and noising and denoising models. For example, the crypto system 105 may utilize a dataset (e.g., tabular data, image data, textual data, audio data, multimodal data, and/or the like) and the obfuscation features to train the neural network encryption models. Training the neural network encryption models may cause the neural network encryption models to generate the model weights (e.g., encoder model weights, decoder model weights, and/or the like), the latent space, and the noising and denoising models. In some implementations, when training the neural network encryption models, the crypto system 105 may add the obfuscation features to the dataset to generate an obfuscated dataset, and may train the neural network encryption models, with the obfuscated dataset, to generate the model weights, the latent space, and the noising and denoising models.

In one example, when training the neural network encryption models, the crypto system 105 may add the obfuscation features (e.g., populated by noise) to the dataset, which may cause the neural network encryption models to be overfit and may add confusion and/or obfuscation to fool a potential attacker. For an autoencoder model, the crypto system 105 may train the autoencoder model until a good fit on input data is achieved, which ensures overfitting. For a diffusion model, the crypto system 105 may train the diffusion model to remove small amounts of noise at every time step. For a flow-based model, the crypto system 105 may train the flow-based model for the input dataset. In some implementations, the crypto system 105 may determine an appropriate representation for the encryption problem (e.g., representation theory may be utilized to represent encryption problems in linear algebra, such as matrix algebra) and may utilize the overfitting to ensure the retrieval of the original data. The overfitting may oppose traditional training where overfitting is a problem since the latent space is not optimized.

Figure 1E:
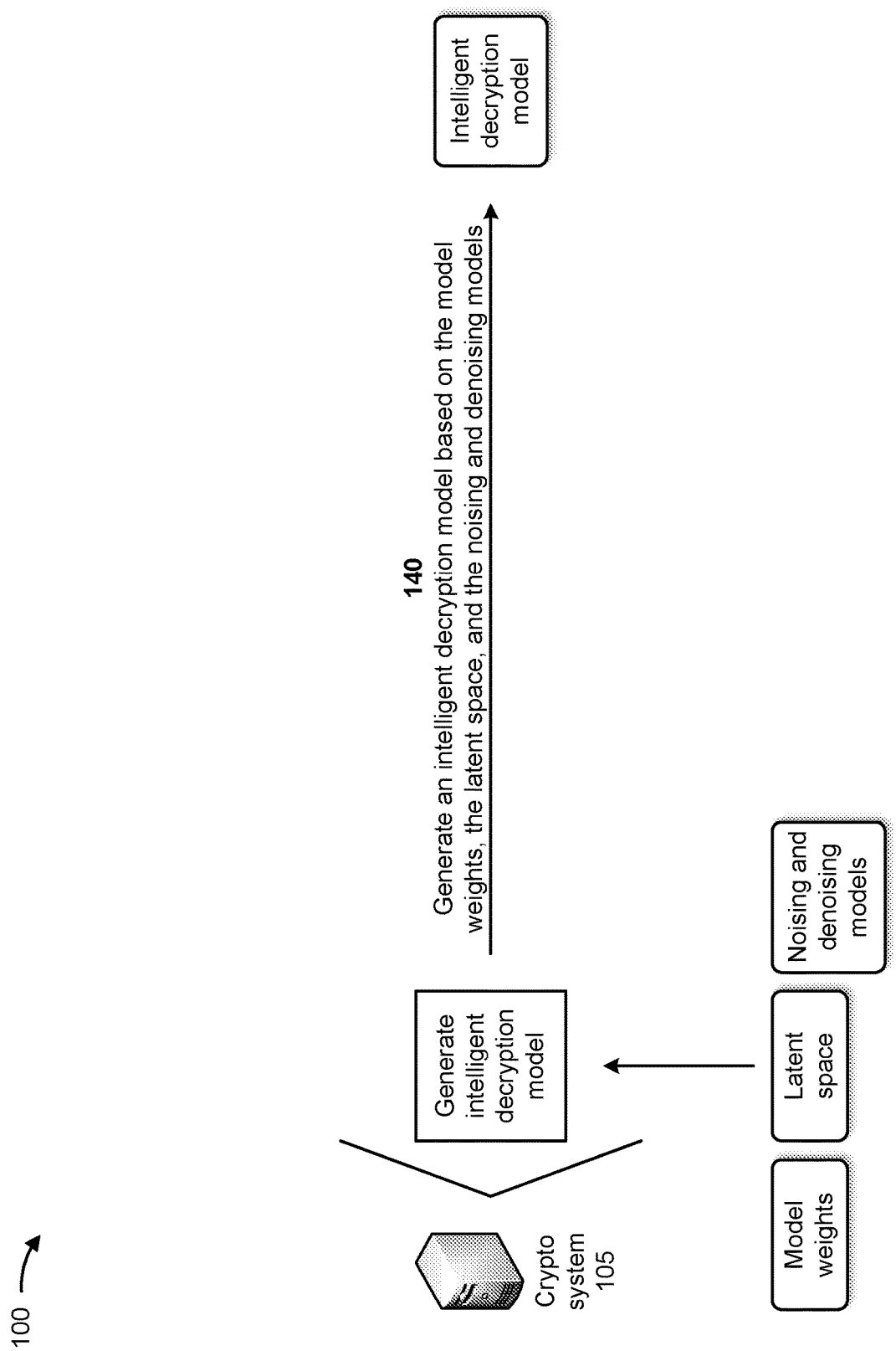

As shown in FIG. 1E, and by reference number 140, the crypto system 105 may generate an intelligent decryption model based on the model weights, the latent space, and the noising and denoising models. For example, if the neural network encryption model is an autoencoder model, the crypto system 105 may generate the intelligent decryption model based on decoder models, the model weights, and the latent space. If the neural network encryption model is a diffusion model, the crypto system 105 may generate the intelligent decryption model based on a denoised model, the model weights, and the latent space. If the neural network encryption model is flow-based model, the crypto system 105 may generate the intelligent decryption model based on normalizing flows, the model weights, and the latent space. In some implementations, the crypto system 105 may utilize immune policies (e.g., classified documents may be decrypted to be read only on a specified device within a certain location) to generate the intelligent decryption model.

In some implementations, the crypto system 105 may generate the intelligent decryption model as an autonomous entity that can act upon a sandboxed environment (e.g., secure containerized application), encapsulate the decoder models, the denoising models, and the normalizing flows models, utilize immune rules to verify whether a target environment is valid (e.g., identify and validate information from a network or services executing in the target environment), and/or the like. In some implementations, the intelligent decryption model may include code that is compiled and obfuscated into a binary format (e.g., which is difficult to understand or reverse engineer). In some implementations, the crypto system 105 may generate the intelligent decryption model as a cloud-based virtual machine.

Figure 1F:
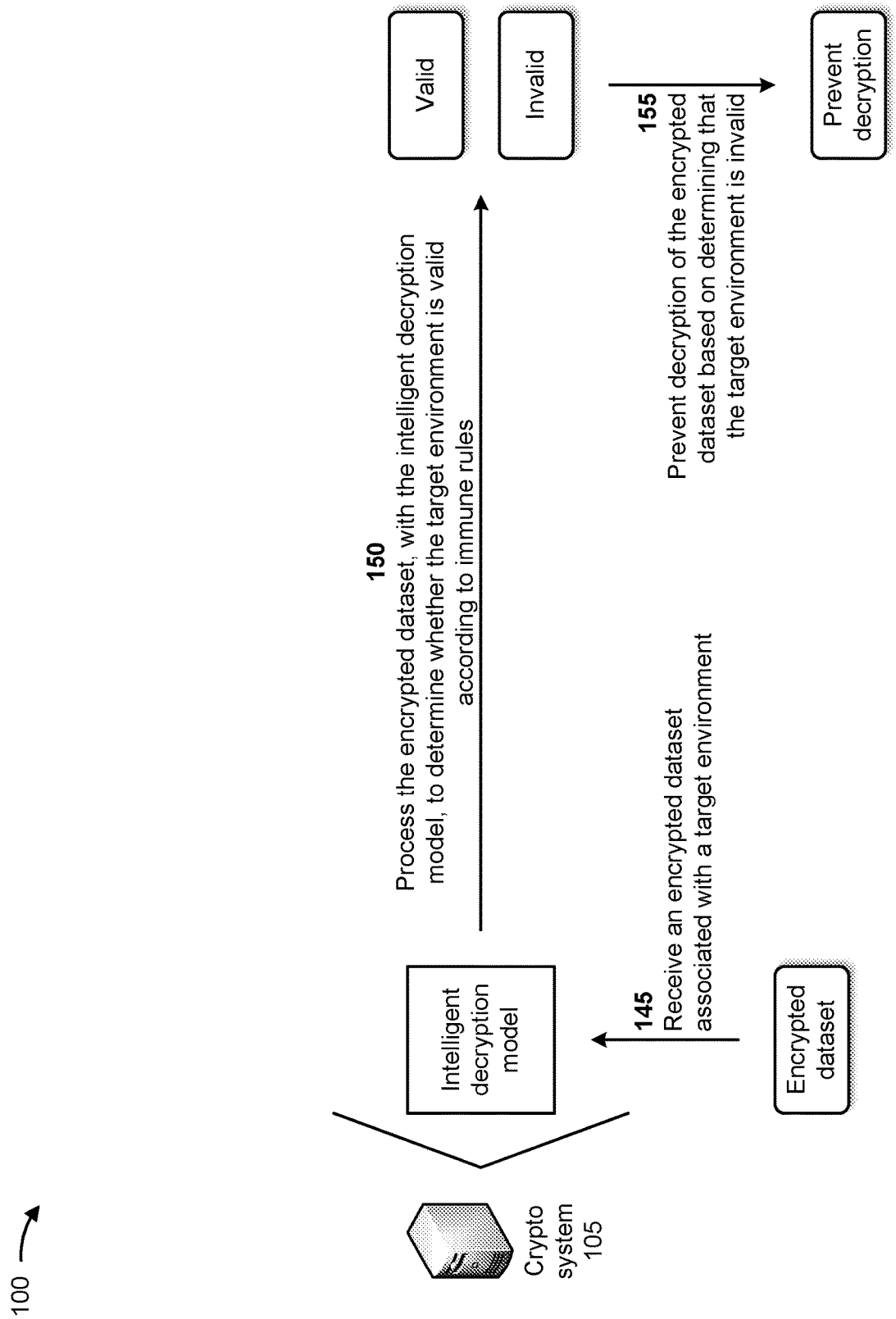

As shown in FIG. 1F, and by reference number 145, the crypto system 105 may receive an encrypted dataset associated with a target environment. For example, the target environment shown in FIG. 1A (e.g., an identity-based public key cryptography system) may generate the encrypted dataset, and may provide the encrypted dataset to the crypto system 105. The crypto system 105 may receive the encrypted dataset from the target environment. In some implementations, the crypto system 105 may continuously receive the encrypted dataset, may periodically receive the encrypted dataset, may receive the encrypted dataset based on requesting the encrypted dataset, and/or the like.

As further shown in FIG. 1F, and by reference number 150, the crypto system 105 may process the encrypted dataset, with the intelligent decryption model, to determine whether the target environment is valid according to immune rules. For example, before decrypting the encrypted dataset, the intelligent decryption model may determine whether the target environment is valid according to the immune rules (e.g., observed states of the target environment, such as installed and/or executing software). In some implementations, the intelligent decryption model may determine that the target environment is invalid according to the immune rules. Alternatively, the intelligent decryption model may determine that the target environment is valid according to the immune rules.

As further shown in FIG. 1F, and by reference number 155, the crypto system 105 may prevent decryption of the encrypted dataset based on determining that the target environment is invalid. For example, if the intelligent decryption model determines that the target environment is invalid according to the immune rules, the crypto system 105 may prevent the intelligent decryption model from decrypting the encrypted dataset. In this way, the crypto system 105 may prevent the encrypted dataset from being compromised by the invalid target environment.

As shown in FIG. 1G, and by reference number 160, the crypto system 105 may process the encrypted dataset, with the intelligent decryption model, based on determining that the target environment is valid and to generate a decrypted dataset. For example, if the intelligent decryption model determines that the target environment is valid according to the immune rules, the crypto system 105 may process the encrypted dataset, with the intelligent decryption model, to generate the decrypted dataset. In some implementations, the crypto system 105 may retrieve the model weights and the obfuscation features, and may apply the decoder model to generate the decrypted data (e.g., original data) for the autoencoder model. Alternatively, the crypto system 105 may recover the decrypted data from noise by learning to reverse the diffusion process for the diffusion model. Alternatively, the crypto system 105 may recover the decrypted data by reversing the normalizing flows process and removing the obfuscation features for the flow-based model.

Figure 1H:
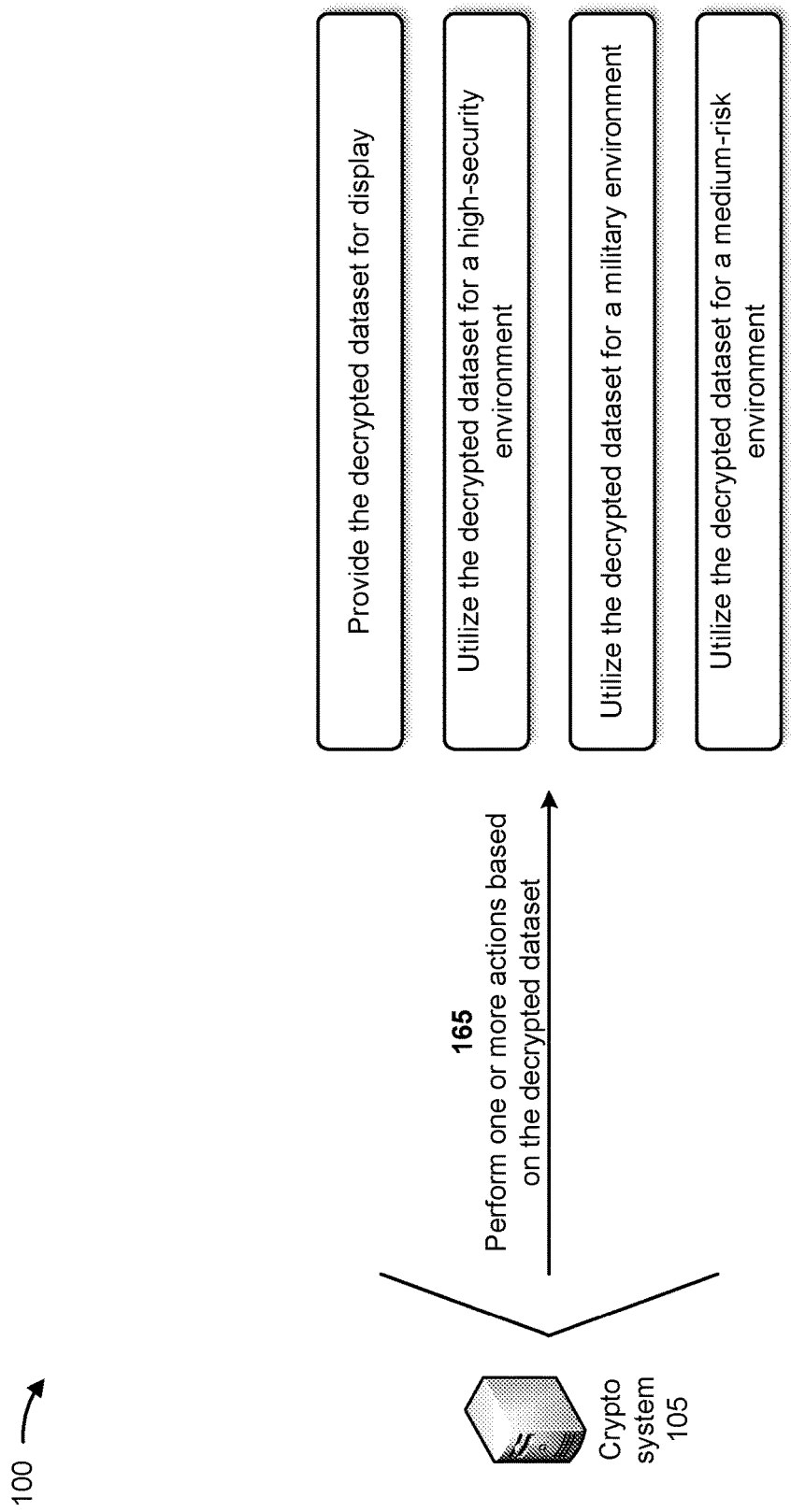

As shown in FIG. 1H, and by reference number 165, the crypto system 105 may perform one or more actions based on the decrypted dataset. In some implementations, performing the one or more actions includes the crypto system 105 providing the decrypted dataset for display. For example, the crypto system 105 may provide the decrypted dataset to the first user device 120-1, and the first user device 120-1 may receive the decrypted dataset. The first user device 120-1 may display the decrypted dataset to a user of the first user device 120-1. In this way, the crypto system 105 conserves computing resources, networking resources, and/or other resources that would have otherwise been consumed by failing to protect data from security threats.

In some implementations, performing the one or more actions includes the crypto system 105 utilizing the decrypted dataset for a high-security environment. For example, if the decrypted dataset is to be utilized for a high-security (e.g., a government) environment, the crypto system 105 may provide the decrypted dataset to only restricted personnel that are authorized to review the decrypted dataset. In this way, the crypto system 105 conserves computing resources, networking resources, and/or other resources that would have otherwise been consumed by attempting to recover data compromised by security threats.

In some implementations, performing the one or more actions includes the crypto system 105 utilizing the decrypted dataset for a military environment. For example, if the decrypted dataset is to be utilized for a military environment, the crypto system 105 may provide the decrypted dataset to only military personnel that are authorized to review the decrypted dataset. In this way, the crypto system 105 conserves computing resources, networking resources, and/or other resources that would have otherwise been consumed by identifying data compromised by security threats.

In some implementations, performing the one or more actions includes the crypto system 105 utilizing the decrypted dataset for a medium-risk (e.g., corporate) environment. For example, if the decrypted dataset is to be utilized for a corporate environment, the crypto system 105 may provide the decrypted dataset to only corporate personnel that are authorized to review the decrypted dataset. In this way, the crypto system 105 conserves computing resources, networking resources, and/or other resources that would have otherwise been consumed by handling inappropriate uses of data compromised by security threats.

In some implementations, the crypto system 105 may be associated with a data structure (e.g., a database, a table, a list, and/or the like) that stores data associated with neural network model parameters (e.g., a quantity of layers, layer types, activation functions, and/or the like), overfitting parameters (e.g., training and tuning parameters), obfuscation features parameters (e.g., noise function types), key management protocol parameters (e.g., Kyber parameters), immune policies (e.g., location policies), and/or the like.

In this way, the crypto system 105 provides enhanced multi-layered security with encryption models that improve zero trust architectures. For example, the crypto system 105 may provide a neural network model-based encryption layer to current infrastructures to enhance zero trust security for extremely sensitive data, such as customer proprietary network data, government data, military data, and/or the like. The neural network model-based encryption layer may be based on private generative encrypting machine learning models that are shared through an intelligent agent. The crypto system 105 may enhance zero trust data security efficiency to mitigate threats and future advances in decryption methods. Thus, the crypto system 105 may conserve computing resources, networking resources, and/or other resources that would have otherwise been consumed by failing to protect data from security threats, attempting to recover data compromised by security threats, identifying data compromised by security threats, handling inappropriate uses of data compromised by security threats, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
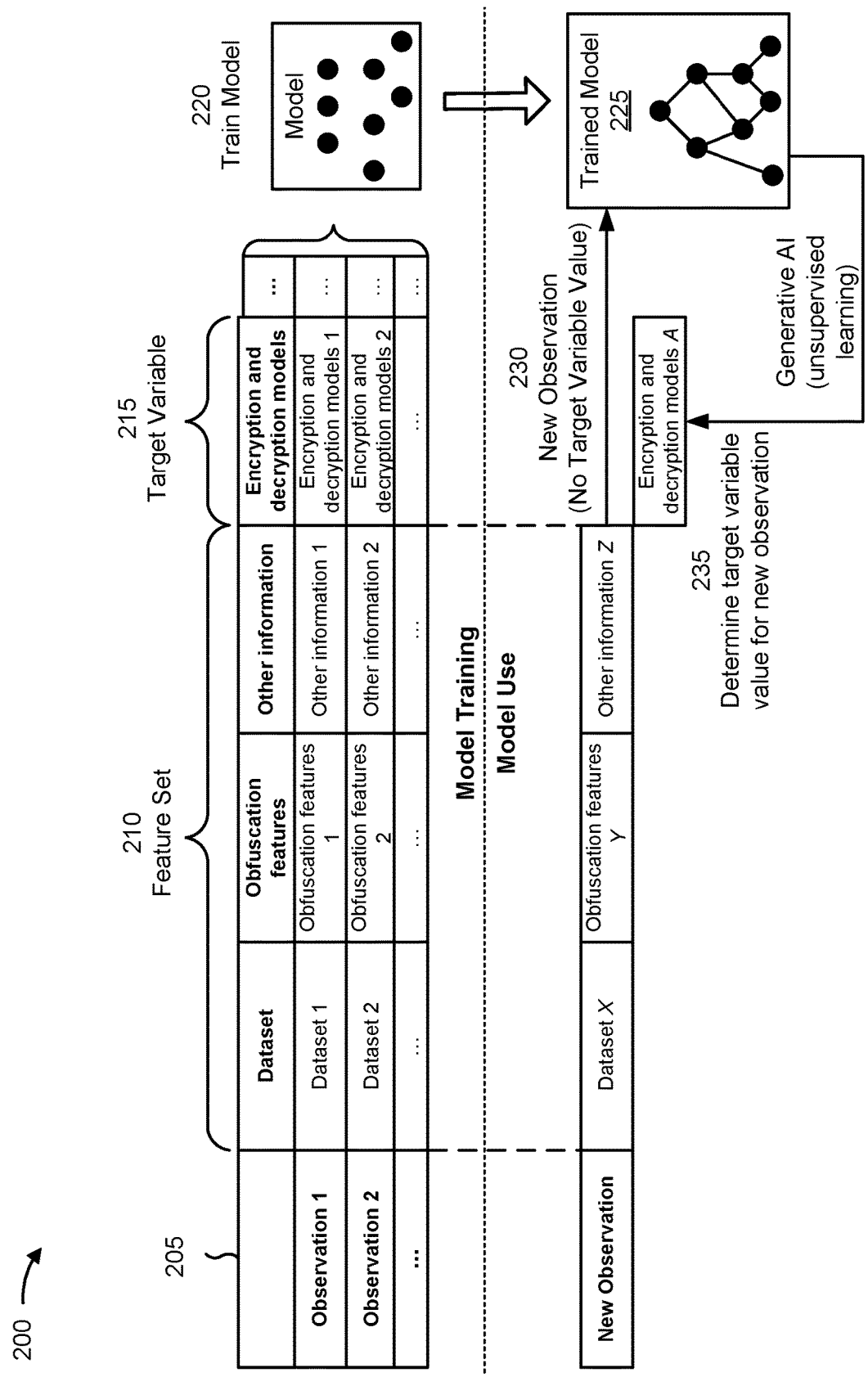
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the crypto system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the crypto system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the crypto system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a dataset, a second feature of obfuscation features, a third feature of other information, and so on. As shown, for a first observation, the first feature may have a value of dataset 1, the second feature may have a value of obfuscation features 1, the third feature may have a value of other information 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable are encryption and decryption models, which has a value of encryption and decryption models 1 for the first observation. The feature set and target variable described above are provided as examples, and other examples may differ from what is described above.

The target variable may represent a value that a machine learning model is being trained to generate, and the feature set may represent the variables that are input to a trained machine learning model to generate a value for the target variable. The set of observations may include target variable values so that the machine learning model can be trained to recognize patterns in the feature set that lead to a target variable value. A machine learning model that is trained to generate a target variable value may be referred to as a trained machine learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of dataset X, a second feature of obfuscation features Y, a third feature of other information Z, and so on, as an example. The machine learning system may apply the trained machine learning model 225 to the new observation to generate an output (e.g., a result). The type of output may depend on the type of machine learning model and/or the type of machine learning task being performed. For example, the output may include a generated value of a target variable. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may generate a value of encryption and decryption models A for the target variable of the encryption and decryption models for the new observation, as shown by reference number 235. Based on this generated value, the machine learning system may provide a first recommendation, may provide output for determination of a first recommendation, may perform a first automated action, and/or may cause a first automated action to be performed (e.g., by instructing another device to perform the automated action), among other examples.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine encryption and decryption models. The machine learning system may enable recognition and/or identification of tens, hundreds, thousands, or millions of features and/or feature values for tens, hundreds, thousands, or millions of observations, thereby increasing accuracy and consistency and reducing delay associated with determining encryption and decryption models relative to requiring computing resources to be allocated for tens, hundreds, or thousands of operators to manually determine a encryption and decryption models using the features or feature values.

As indicated above, FIG. 2 is provided as an example. Other examples may differ from what is described in connection with FIG. 2.

Figure 3:
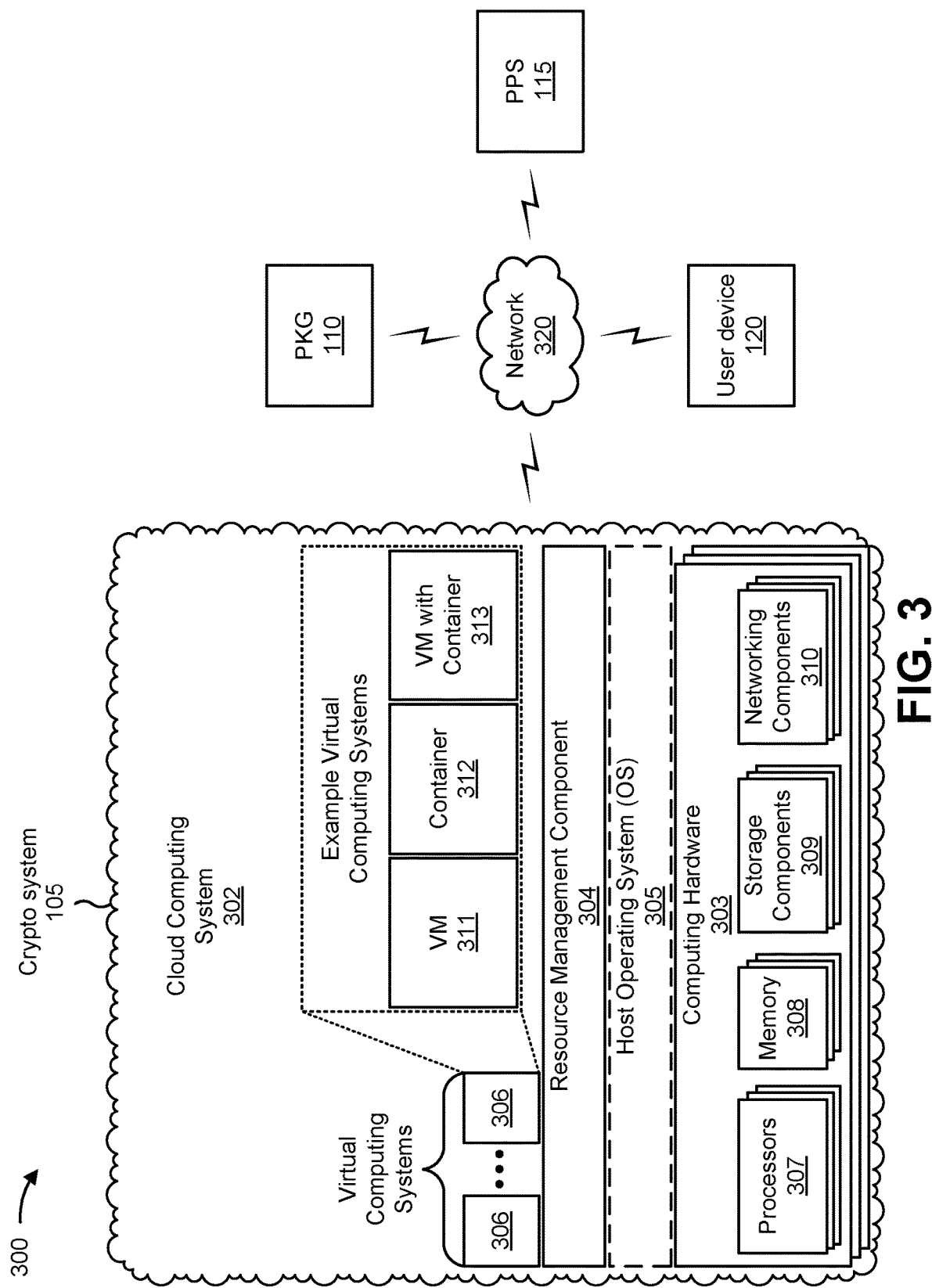
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the crypto system 105, which may include one or more elements of and/or may execute within a cloud computing system 302. The cloud computing system 302 may include one or more elements 303-313, as described in more detail below. As further shown in FIG. 3, the environment 300 may include the PKG 110, the PPS 115, the user device 120, and/or a network 320. Devices and/or elements of the environment 300 may interconnect via wired connections and/or wireless connections.

The PKG 110 may include one or more devices capable of receiving, generating, storing, processing, providing, and/or routing information, as described elsewhere herein. The PKG 110 may include a communication device and/or a computing device. For example, the PKG 110 may include a server, such as an application server, a client server, a web server, a database server, a host server, a proxy server, a virtual server (e.g., executing on computing hardware), or a server in a cloud computing system. In some implementations, the PKG 110 may include computing hardware used in a cloud computing environment.

The PPS 115 may include one or more devices capable of receiving, generating, storing, processing, providing, and/or routing information, as described elsewhere herein. The PPS 115 may include a communication device and/or a computing device. For example, the PPS 115 may include a server, such as an application server, a client server, a web server, a database server, a host server, a proxy server, a virtual server (e.g., executing on computing hardware), or a server in a cloud computing system. In some implementations, the PPS 115 may include computing hardware used in a cloud computing environment.

The user device 120 may include one or more devices capable of receiving, generating, storing, processing, and/or providing information, as described elsewhere herein. The user device 120 may include a communication device and/or a computing device. For example, the user device 120 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the crypto system 105 may include one or more elements 303-313 of the cloud computing system 302, may execute within the cloud computing system 302, and/or may be hosted within the cloud computing system 302, in some implementations, the crypto system 105 may not be cloud-based (e.g., may be implemented outside of a cloud computing system) or may be partially cloud-based. For example, the crypto system 105 may include one or more devices that are not part of the cloud computing system 302, such as a device 400 of FIG. 4, which may include a standalone server or another type of computing device. The crypto system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
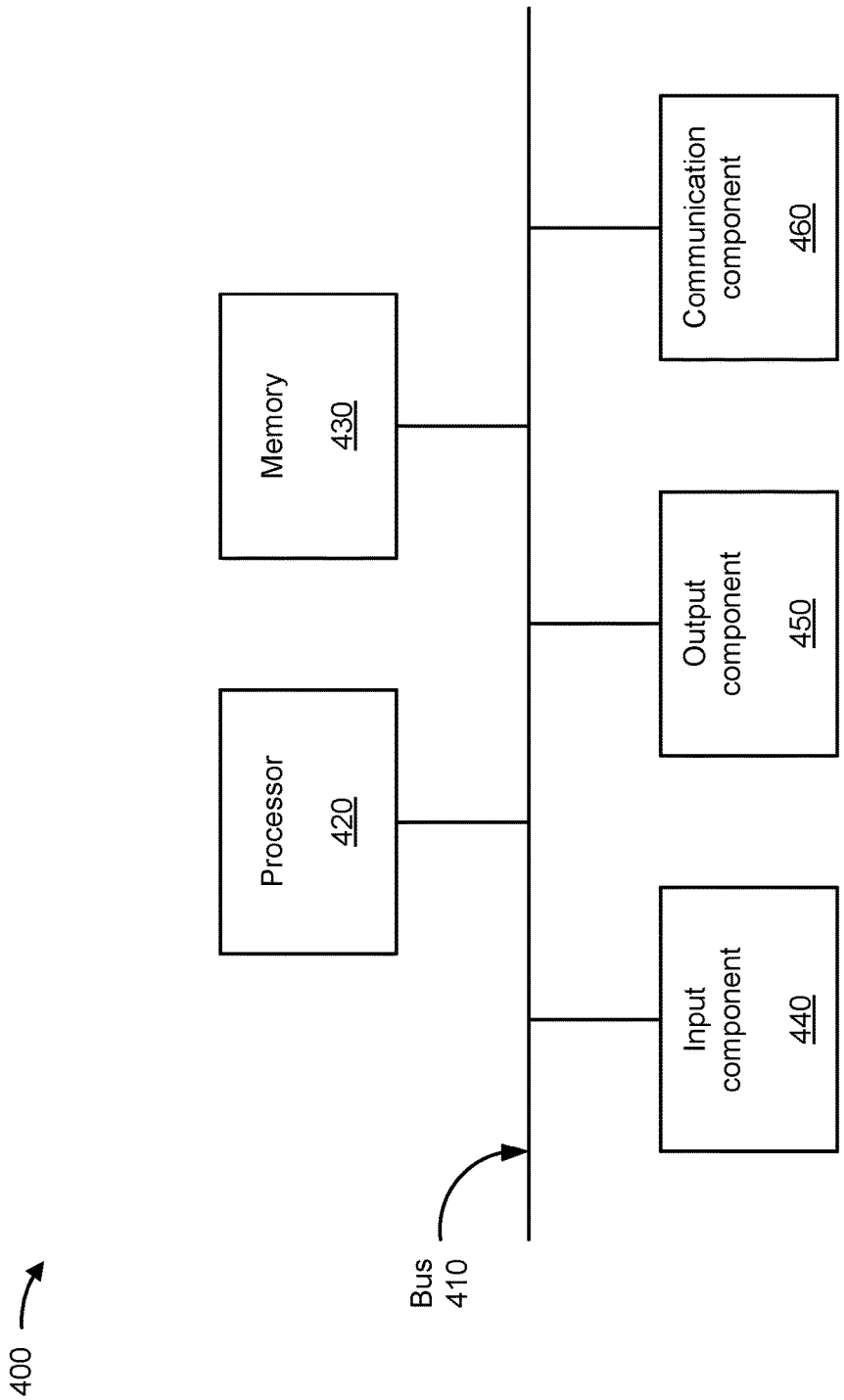
FIG. 4 is a diagram of example components of one or more devices of FIG. 3.

FIG. 4 is a diagram of example components of a device 400, which may correspond to the crypto system 105, the PKG 110, the PPS 115, and/or the user device 120. In some implementations, the crypto system 105, the PKG 110, the PPS 115, and/or the user device 120 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
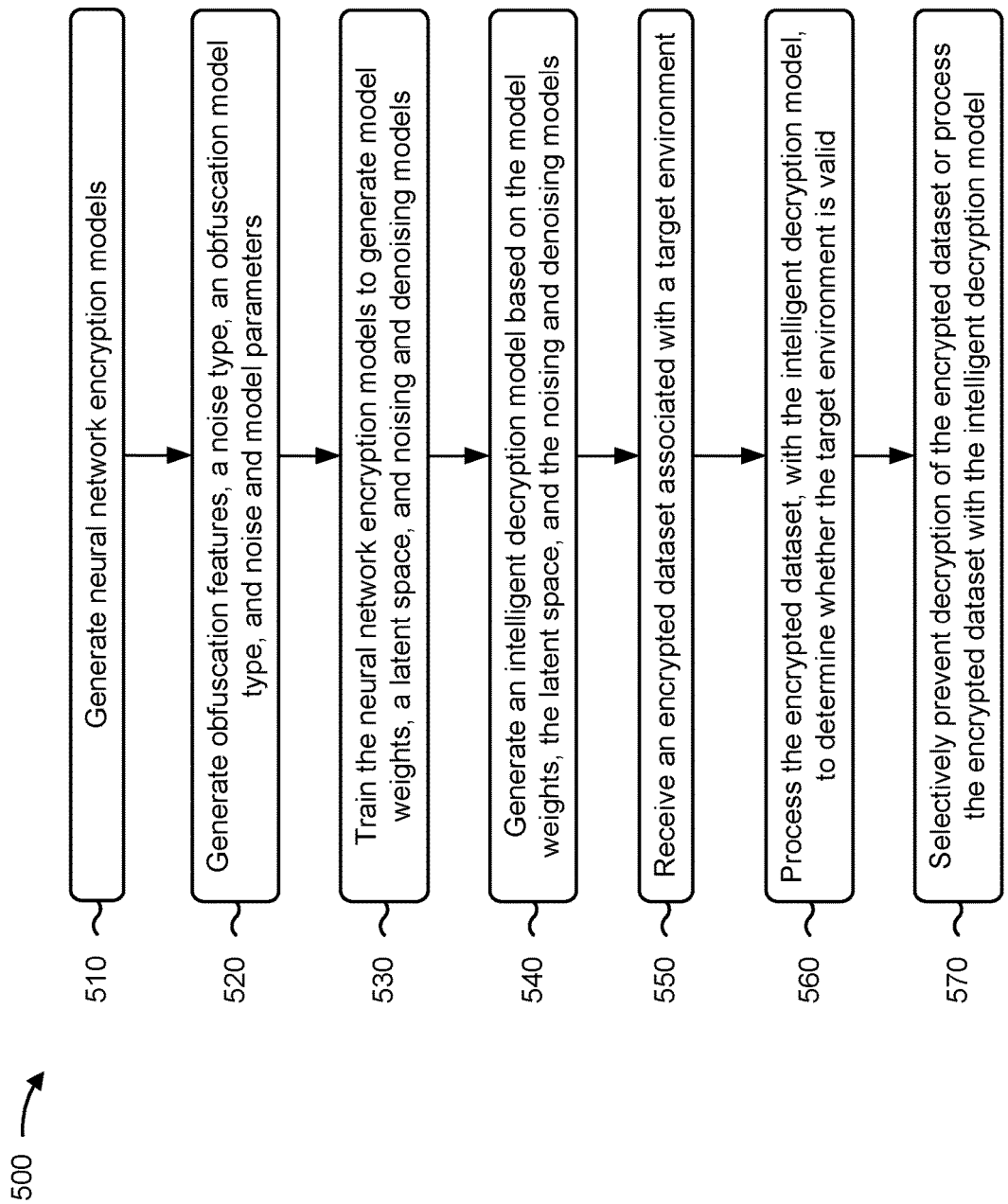
FIG. 5 is a flowchart of an example process for providing enhanced multi-layered security with encryption models that improve zero-trust architectures.

FIG. 5 depicts a flowchart of an example process 500 for providing enhanced multi-layered security with encryption models that improve zero-trust architectures. In some implementations, one or more process blocks of FIG. 5 may be performed by a device (e.g., the crypto system 105). In some implementations, one or more process blocks of FIG. 5 may be performed by another device or a group of devices separate from or including the device, such as a PKG (e.g., the PKG 110) and/or a PPS (e.g., the PPS 115). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include generating neural network encryption models (block 510). For example, the device may generate neural network encryption models based on a dataset descriptor, a dataset geometry, and selected neural network types, as described above. In some implementations, when the neural network encryption models include an autoencoder model, generating the neural network encryption models includes generating, for the autoencoder model, random parameters associated with one or more of a quantity of layers, layer types, or an activation for each of the layers, and generating the autoencoder model based on the random parameters.

In some implementations, when the neural network encryption models include a diffusion model, generating the neural network encryption models includes generating random parameters for a forward diffusion process and a reverse forward diffusion process, defining a Markov chain of diffusion steps to gradually add random noise to data, and generating the diffusion model based on the random parameters and the Markov chain of diffusion steps. In some implementations, when the neural network encryption models include a flow-based model, generating the neural network encryption models includes generating a model that maps an unknown distribution in an input space to a known distribution in a latent space using normalizing flows, and adjusting the model to directly process non-Euclidean structured data as input and to generate the flow-based model. In some implementations, the neural network encryption models include one or more of an autoencoder model, a diffusion model, or a flow-based model.

As further shown in FIG. 5, process 500 may include generating obfuscation features, a noise type, an obfuscation model type, and noise and model parameters (block 520). For example, the device may generate obfuscation features based on the dataset descriptor, a noise type, an obfuscation model type, and noise and model parameters, as described above. In some implementations, the dataset descriptor identifies one or more of a data type, time series data, features, a data size, or a data domain; the noise type includes one or more of white noise, red noise, purple noise, grey noise, random walks noise, random walks with drift noise, Laplacian noise, gradient noise, Voronoi noise, simplex noise, Perlin noise, or fractal noise; and the obfuscation model type includes one or more of an autoregressive model, an autoregressive integrated moving average model, a Gaussian mixture autoregressive model, a generative adversarial network model, or a mathematical function.

As further shown in FIG. 5, process 500 may include training the neural network encryption models to generate model weights, a latent space, and noising and denoising models (block 530). For example, the device may train the neural network encryption models, with a dataset and the obfuscation features, to generate model weights, a latent space, and noising and denoising models, as described above. In some implementations, training the neural network encryption models includes adding the obfuscation features to the dataset to generate an obfuscated dataset, and training the neural network encryption models, with the obfuscated dataset, to generate the model weights, the latent space, and the noising and denoising models.

As further shown in FIG. 5, process 500 may include generating an intelligent decryption model based on the model weights, the latent space, and the noising and denoising models (block 540). For example, the device may generate an intelligent decryption model based on the model weights, the latent space, and the noising and denoising models, as described above. In some implementations, the intelligent decryption model includes code that is compiled and obfuscated into a binary format.

As further shown in FIG. 5, process 500 may include receiving an encrypted dataset associated with a target environment (block 550). For example, the device may receive an encrypted dataset associated with a target environment, as described above. In some implementations, the target environment is an identity-based public key cryptography system.

As further shown in FIG. 5, process 500 may include processing the encrypted dataset, with the intelligent decryption model, to determine whether the target environment is valid (block 560). For example, the device may process the encrypted dataset, with the intelligent decryption model, to determine whether the target environment is valid according to immune rules, as described above.

As further shown in FIG. 5, process 500 may include selectively preventing decryption of the encrypted dataset or processing the encrypted dataset with the intelligent decryption model (block 570). For example, the device may selectively prevent decryption of the encrypted dataset based on determining that the target environment is invalid, or process, based on determining that the target environment is valid, the encrypted dataset, with the intelligent decryption model, to generate a decrypted dataset, as described above. In some implementations, processing the encrypted dataset, with the intelligent decryption model, to generate the decrypted dataset includes utilizing the model weights to recover an obfuscated dataset from the encrypted dataset, and removing the obfuscation features from the obfuscated dataset to generate the decrypted dataset.

In some implementations, process 500 includes performing one or more actions based on the decrypted dataset. In some implementations, performing the one or more actions includes one or more of providing the decrypted dataset for display, or utilizing the decrypted dataset for a government environment. In some implementations, performing the one or more actions includes one or more of utilizing the decrypted dataset for a military environment, or utilizing the decrypted dataset for a corporate environment.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    generating, by a device, neural network encryption models based on a dataset descriptor, a dataset geometry, and selected neural network types;
    generating, by the device, obfuscation features based on the dataset descriptor, a noise type, an obfuscation model type, and noise and model parameters;
    training, by the device, the neural network encryption models, with a dataset and the obfuscation features, to generate model weights, a latent space, and noising and denoising models;

generating, by the device, an intelligent decryption model based on the model weights, the latent space, and the noising and denoising models;
receiving, by the device, an encrypted dataset associated with a target environment;
processing, by the device, the encrypted dataset, with the intelligent decryption model, to determine whether the target environment is valid according to immune rules; and
selectively:
  preventing, by the device, decryption of the encrypted dataset based on determining that the target environment is invalid, or
  processing, by the device and based on determining that the target environment is valid, the encrypted dataset, with the intelligent decryption model, to generate a decrypted dataset.

2. The method of claim 1, further comprising:
performing one or more actions based on the decrypted dataset.

3. The method of claim 2, wherein performing the one or more actions comprises one or more of:
providing the decrypted dataset for display; or
utilizing the decrypted dataset for a government environment.

4. The method of claim 2, wherein performing the one or more actions comprises one or more of:
utilizing the decrypted dataset for a military environment; or
utilizing the decrypted dataset for a corporate environment.

5. The method of claim 1, wherein the target environment is an identity-based public key cryptography system.

6. The method of claim 1, wherein, when the neural network encryption models include an autoencoder model, generating the neural network encryption models comprises:
generating, for the autoencoder model, random parameters associated with one or more of a quantity of layers, layer types, or an activation for each of the layers; and
generating the autoencoder model based on the random parameters.

7. The method of claim 1, wherein, when the neural network encryption models include a diffusion model, generating the neural network encryption models comprises:
generating random parameters for a forward diffusion process and a reverse forward diffusion process;
defining a Markov chain of diffusion steps to gradually add random noise to data; and
generating the diffusion model based on the random parameters and the Markov chain of diffusion steps.

8. A device, comprising:
one or more processors configured to:
  generate neural network encryption models based on a dataset descriptor, a dataset geometry, and selected neural network types;
  generate obfuscation features based on the dataset descriptor, a noise type, an obfuscation model type, and noise and model parameters;
  train the neural network encryption models, with a dataset and the obfuscation features, to generate model weights, a latent space, and noising and denoising models;
  generate an intelligent decryption model based on the model weights, the latent space, and the noising and denoising models;
  receive an encrypted dataset associated with a target environment;
  process the encrypted dataset, with the intelligent decryption model, to determine whether the target environment is valid according to immune rules; and
  process, based on determining that the target environment is valid, the encrypted dataset, with the intelligent decryption model, to generate a decrypted dataset.

9. The device of claim 8, wherein, when the neural network encryption models include a flow-based model, the one or more processors, to generate the neural network encryption models, are configured to:
generate a model that maps an unknown distribution in an input space to a known distribution in a latent space using normalizing flows; and
adjust the model to directly process non-Euclidean structured data as input and to generate the flow-based model.

10. The device of claim 8, wherein the dataset descriptor identify one or more of a data type, time series data, features, a data size, or a data domain,
wherein the noise type includes one or more of white noise, red noise, purple noise, grey noise, random walks noise, random walks with drift noise, Laplacian noise, gradient noise, Voronoi noise, simplex noise, Perlin noise, or fractal noise, and
the obfuscation model type includes one or more of an autoregressive model, an autoregressive integrated moving average model, a Gaussian mixture autoregressive model, a generative adversarial network model, or a mathematical function.

11. The device of claim 8, wherein the one or more processors, to train the neural network encryption models, are configured to:
add the obfuscation features to the dataset to generate an obfuscated dataset; and
train the neural network encryption models, with the obfuscated dataset, to generate the model weights, the latent space, and the noising and denoising models.

12. The device of claim 8, wherein the intelligent decryption model includes code that is compiled and obfuscated into a binary format.

13. The device of claim 8, wherein the neural network encryption models include one or more of an autoencoder model, a diffusion model, or a flow-based model.

14. The device of claim 8, wherein the one or more processors, to process the encrypted dataset, with the intelligent decryption model, to generate the decrypted dataset, are configured to:
utilize the model weights to recover an obfuscated dataset from the encrypted dataset; and
remove the obfuscation features from the obfuscated dataset to generate the decrypted dataset.

15. A non-transitory computer-readable medium storing a set of instructions, the set of instructions comprising:
one or more instructions that, when executed by one or more processors of a device, cause the device to:
  generate neural network encryption models based on a dataset descriptor, a dataset geometry, and selected neural network types;
  generate obfuscation features based on the dataset descriptor, a noise type, an obfuscation model type, and noise and model parameters;

train the neural network encryption models, with a dataset and the obfuscation features, to generate model weights, a latent space, and noising and denoising models;
generate an intelligent decryption model based on the model weights, the latent space, and the noising and denoising models;
receive an encrypted dataset associated with a target environment;
process the encrypted dataset, with the intelligent decryption model, to determine whether the target environment is valid according to immune rules;
process, based on determining that the target environment is valid, the encrypted dataset, with the intelligent decryption model, to generate a decrypted dataset; and
perform one or more actions based on the decrypted dataset.

16. The non-transitory computer-readable medium of claim 15, wherein the one or more instructions, that cause the device to perform the one or more actions, cause the device to one or more of:
provide the decrypted dataset for display;
utilize the decrypted dataset for a government environment;
utilize the decrypted dataset for a military environment; or
utilize the decrypted dataset for a corporate environment.

17. The non-transitory computer-readable medium of claim 15, wherein, when the neural network encryption models include an autoencoder model, the one or more instructions, that cause the device to generate the neural network encryption models, cause the device to:
generate, for the autoencoder model, random parameters associated with one or more of a quantity of layers, layer types, or an activation for each of the layers; and
generate the autoencoder model based on the random parameters.

18. The non-transitory computer-readable medium of claim 15, wherein, when the neural network encryption models include a diffusion model, the one or more instructions, that cause the device to generate the neural network encryption models, cause the device to:
generate random parameters for a forward diffusion process and a reverse forward diffusion process;
define a Markov chain of diffusion steps to gradually add random noise to data; and
generate the diffusion model based on the random parameters and the Markov chain of diffusion steps.

19. The non-transitory computer-readable medium of claim 15, wherein, when the neural network encryption models include a flow-based model, the one or more instructions, that cause the device to generate the neural network encryption models, cause the device to:
generate a model that maps an unknown distribution in an input space to a known distribution in a latent space using normalizing flows; and
adjust the model to directly process non-Euclidean structured data as input and to generate the flow-based model.

20. The non-transitory computer-readable medium of claim 15, wherein the one or more instructions, that cause the device to train the neural network encryption models, cause the device to:
add the obfuscation features to the dataset to generate an obfuscated dataset; and
train the neural network encryption models, with the obfuscated dataset, to generate the model weights, the latent space, and the noising and denoising models.

* * * * *